United States Patent [19] [11] 4,086,874
Sterner [45] May 2, 1978

[54] SUPPORTING STRUCTURE FOR FISH NETS OR THE LIKE

[76] Inventor: Karl Thore Sterner, Fabovagen 13, S-781 00 Borlange, Sweden

[21] Appl. No.: 714,139

[22] Filed: Aug. 13, 1976

[30] Foreign Application Priority Data

Aug. 15, 1975 Norway .............................. 752844

[51] Int. Cl.² ............................................. A01K 63/00
[52] U.S. Cl. ...................................................... 119/3
[58] Field of Search ................. 119/3, 2, 4; 43/7, 100, 43/103, 104, 105; 9/11 R

[56] References Cited

U.S. PATENT DOCUMENTS

| | | | |
|---|---|---|---|
| 2,813,507 | 11/1957 | Miller | 119/2 |
| 2,874,505 | 2/1959 | Cobile | 43/7 |
| 3,653,358 | 4/1972 | Fremont | 119/3 |
| 4,003,338 | 1/1977 | Neff et al. | 119/3 |
| 4,013,042 | 3/1977 | Ingold | 119/3 |

Primary Examiner—Hugh R. Chamblee
Attorney, Agent, or Firm—Dressler, Goldsmith, Clement, Gordon & Shore, Ltd.

[57] ABSTRACT

A supporting structure for a fish net or the like including a plurality of vertically extending supporting elements projecting, at least partially, above the water surface. Elongate connecting elements extending generally parallel to the water surface are releasably connected to the supporting elements to form a frame. A fish net is secured to the connecting elements, and is retained at a predetermined level relative to the water surface by inflatable members mounted upon the supporting elements. The connecting elements and supporting elements retain the inflatable members at fixed predetermined distances from each other.

7 Claims, 4 Drawing Figures

U.S. Patent May 2, 1978 Sheet 1 of 2 4,086,874
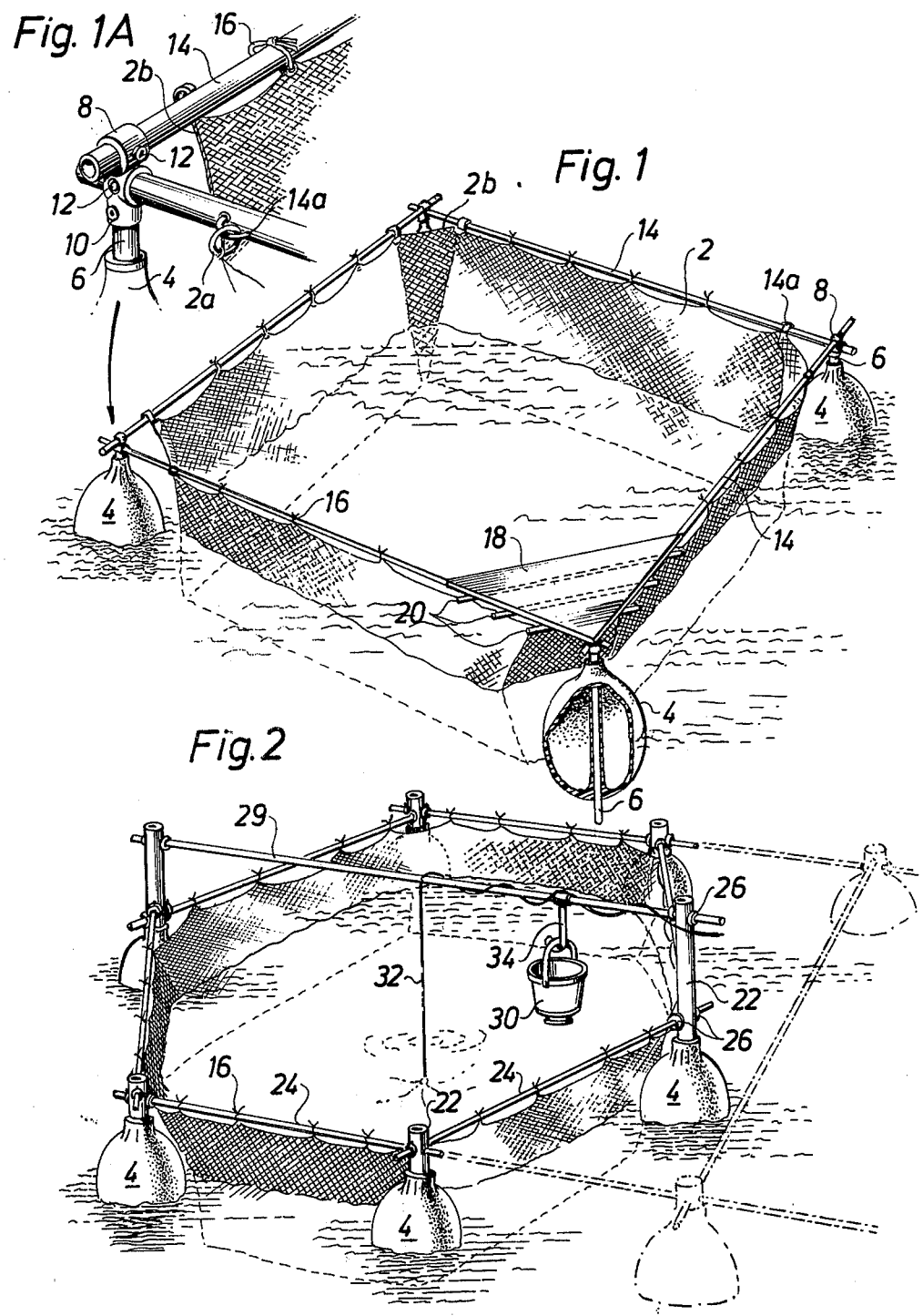

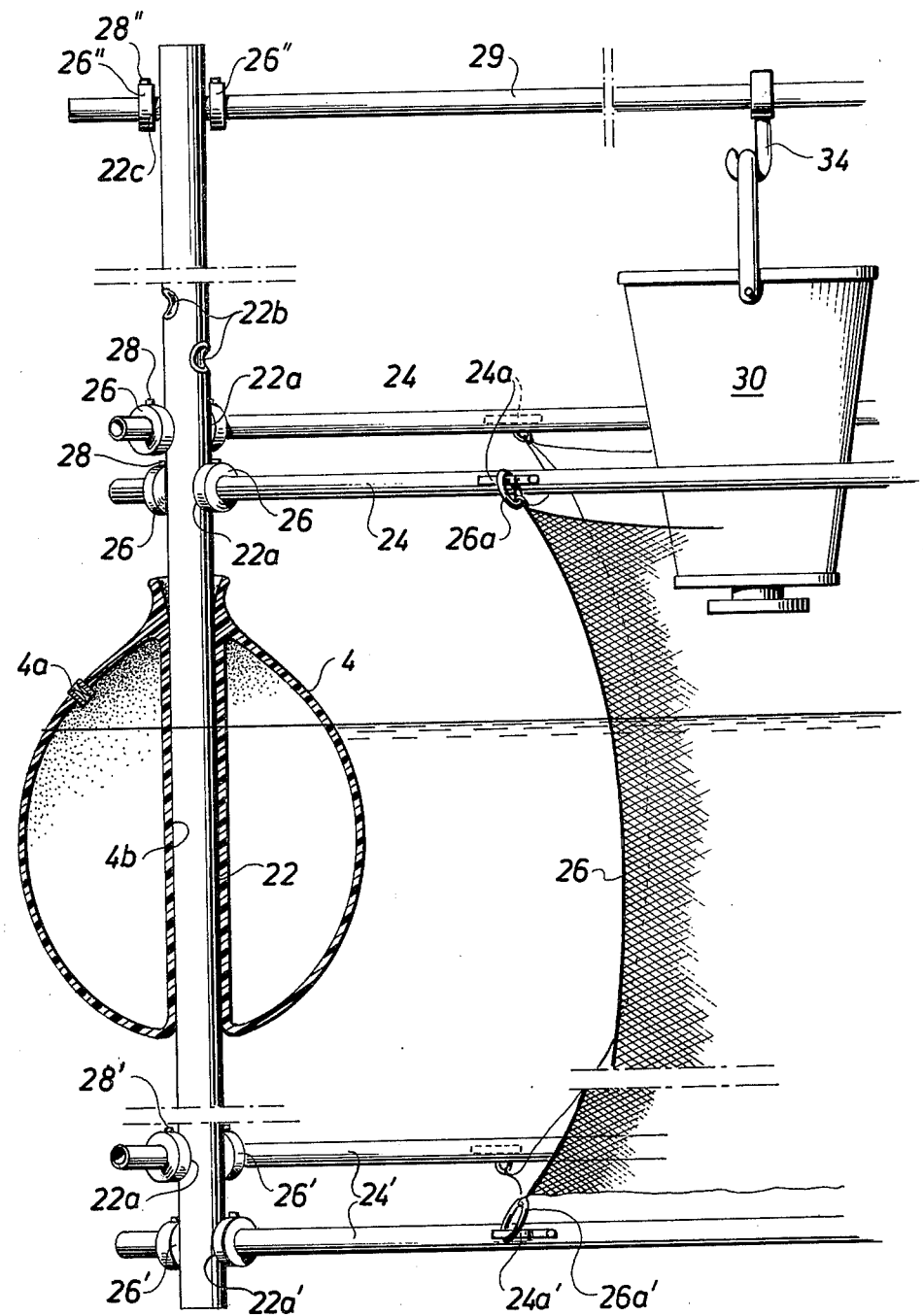

SUPPORTING STRUCTURE FOR FISH NETS OR THE LIKE

BACKGROUND OF THE INVENTION

The present invention relates to a supporting structure for fish nets or the like, of the kind disclosed in the preamble to claim 1, a fish net being defined for purpose of this specification as an open net for confining fish to a limited volume of water.

In outdoor pisciculture, fish nets have been used for a long while, these being attached to a support structure floating on the water surface so that the greater portion of such a net is below the water surface while a portion of its mainly vertical walls are above the surface.

The supporting structures used so far have often consisted of a number of air-filled petrol drums on which a wooded frame carrying a fish net has been attached, or by a number of bodies floating on the surface or attached to the sea or lake bottom, which support framed structures to which one or more fish nets are attached. These carrying structures, often manufactured by the pisciculturist himself, suffer however from a number of drawbacks. Among the drawback can be mentioned that the supporting structures have a short life, are heavy and voluminous, resulting in that they must be erected at the place where they are to be used, and they also have deficient attaching means for the nets, are easily broken up in an even comparatively minor rough sea. They contain a large number of details which makes erection time-consuming and cannot be taken apart, thus hardly being transportable from one place to another, which is necessary if they are to be used in water which freezes to ice during the winter.

In later years, pisciculture has however been rationalized considerably, which has involved increased demands on the fish nets, on the structures carrying them and that these structures together with the fish nets supported by them can be generally used in any water at all where the environment is suitable for pisciculture.

SUMMARY OF THE INVENTION

The object of the present invention is therefore to provide a supporting structure which does not suffer from the above-mentioned drawbacks, is simple in construction, contains a small number of details available to a large extent in the open market, can easily be erected and dismantled, has long life, extremely stable even when exposed to difficult conditions such as a rough sea and severe wind, is easy to transport and has a construction allowing the easy replacement of torn or soiled nets.

This object is fulfilled by the supporting structure having the distinguishing features disclosed in the characterizing portions of the patent claims.

DESCRIPTION OF DRAWINGS

Other objects and advantages of the invention are apparent from the following detailed description of two embodiments thereof in conjunction with the appended drawings on which FIG. 1 is a perspective view, partly in section, of an embodiment of the supporting structure according to the present invention.

FIG. 1A is a perspective view of details in the supporting structure according to FIG. 1, FIG. 2 is a perspective view of another embodiment of the supporting structure according to the present invention, and FIG. 3 is a side view partly in section of the supporting structure according to FIG. 2.

DETAILED DESCRIPTION

In FIG. 1, a fish net carried by a supporting structure according to the invention is designated 2. The fish net 2, consisting of a mainly rectangular bottom and four substantially vertical side walls integral therewith, is removably fastened to the supporting structure by means of eyelets or the like attached to the upper contours of the side walls. The supporting structure comprises four bodies in the form of buoys 4 floating on the water, the construction of which will be described more closely in conjunction with FIG. 3, there being a vertical tube 6 fastened in each buoy. On the upper end of each tube 6 there is pushed a scaffolding clamp 8 and it is locked to the tube by means of a set screw 10. The clamp 8 is of the threeway type, with one hole for the tube 6 and two holes at right angles thereto and at right angles to each other for elongate connecting elements in the shape of tubes 14, locked to the clamp by means of set screws 12.

When erecting the structure shown in FIGS. 1 and 1A, the vertical tubes 6 fitted with their scaffolding clamps 8 are first fastened in the buoys 4, whereafter the long tubes 14 are inserted in the clamps 8 so that the tubes 14 also project rather a long way from the clamps 8 in a direction away from the net 2. Eyelets 2a attached to the corners of the net 2 are thereafter hooked into hooks 14a, and the upper contour of the net is tied onto the tube 14 by means of removable tapes or cords 16 which can be attached to the side walls of the net. Thereafter, the scaffolding clamp 8 is moved in a direction away from the net 2 so that the portion of the tube 14 between the clamps increases in length, whereat the net is stretched out so that at least the cords 2b in the upper contour of the net and forming the upper corners thereof which are fastened between the hooks 14a are stretched, whereafter the set screws 12 are tightened.

The frame formed by the tubes 14 and 6 constrained by the clamps 8 thus forms a stiff frame in all directions, and its dimensions cannot be altered without undoing the set screws 12, its stability being increased by the cords 2b in the upper corners of the net being tensioned between the hooks 14a. The tubes 14 and 6 and clamps 8 with screws 10 and 12 are standard details available in any well-stocked ironmonger's, and the length of the tubes can easily be adjusted to the dimensions of different fish nets 2 and their height above the water surface. More than four buoys, tubes etc. can naturally be used for each fish net, whereat it can be made larger, or a system of frames consisting for example of groups of four or six buoys, tubes etc. can be arranged for a plurality of fish nets.

In FIG. 1 there is also shown a platform 18 in the form of a triangular slab which is attached in a suitable way to a plurality of tubes 20 fixed by means of suitable scaffolding clamps on two tubes 14 forming a corner. This platform 18 can be used as a collecting place for equipment or as a working platform for the person who feeds or otherwise works with the fish confined in the net 2.

Another embodiment of the supporting structure according to the invention is shown in FIGS. 2 and 3. The number of buoys 4 here is six, but with simple modifications of the vertical tubes 22 fastened in the buoys this number can be increased or decreased according to requirement. The buoys 4, the construction of which is best shown in FIG. 3, each consists of a plastic or rubber envelope forming a container and having a valve 4a through which air can be introduced or exhausted from the space inside the envelope. The vertical central axis of the container has a tubular portion 4b so that a through-hole is formed in the container. When the container is empty, a vertical tube 22 (or 6) can be inserted in the tubular portion 4b, but when the container is pumped up, the diameter of this tubular portion decreases causing it to clamp onto the tube 22 with large force. When it is desired to adjust the tube 22 in a vertical direction, air is let out of the container and the tube is moved to the desired position, whereafter the container is once again inflated.

In each vertical tube 22 there are made two horizontal throughholes 22a (FIG. 3) forming an angle of about 120° to each other. Horizontal tubes 24, the outer diameter of which is less than that of the tubes 22, are introduced into these holes and locked by means of set screws 28 on rings 26 slipped over the tubes 24 on either side of the tubes 22, the inner diameter of the rings 26 exceeding the outside diameter of the tubes 24 by an insignificant amount. Hooks 24a are attached to the tubes 24, these hooks being identical with the hooks 14a in FIGS. 1 and 1a and constitute the attaching means for rings 26a or the like on the fish net 26.

Holes 22a' also been made in the portion of the vertical tubes 22 extending under the buoys 4, these holes being identical with the holes 22a above the buoys. In holes 22a' there can be inserted the tubes 24', which are identical with the tubes 24 above the buoys, and which have been locked by means of locking rings 26' identical with the rings 26 above the buoys. The tubes 24' fastened under the buoys 4 have the task of further strengthening the construction and carrying attaching means (the hooks 24a') for the eyelets 26a' or the like at the bottom of the net. To adjust the distance between the tubes 24, 24' attached above and below the buoys 4, to the depth of different nets 26, further holes 22b (only two are shown) have been made in the vertical tubes 22. Two of the vertical tubes 22 are considerably longer than the remaining four, and in their upper ends they have each been provided with a hole 22c, in which a tube 29 of the same cross-sectional dimensions as that of the tubes 24 and 24' is attached by means of locking rings 26" of the same kind as used for locking the tubes 24 and 24' to the tubes 22. On this tube 29, which even further stabilizes the construction, there is attached a hook 34 displaceable in the longitudinal direction of the tube 29, for hanging up a remotely controlled feed metering apparatus 30. Furthermore, a rope 32 can be wound around the tube 29, the rope being attached centrally to the bottom of the net 26 for pulling vertically upward when removing fish from the net or cleaning it. The tube 29 can thereby serve as hanging means for the fish net or for one or more nets which are to be attached to the supporting structure instead of a broken or otherwise unusable net. For more easily filling the apparatus 30 and carrying out other work with the fish, a platform (not shown) similar to the platform 18 in FIG. 1 can be mounted at one of the corners in FIG. 2.

The procedure for erecting the supporting structure according to FIGS. 2 and 3 is similar to that described above in conjunction with FIGS. 1 and 1A. Since the ropes in the corners of the net are also tensioned in the embodiment according to FIGS. 2 and 3, before the set screws 28, 28', 28" of the rings 26, 26', 26" are tightened, whereby the tubes 22 are urged towards the centre of the net, it will be understood that the rings 26, 26', 26" arranged on the outside of the tubes 22, i.e. the rings remote from the net, are not necessary. However, they provide surety for the supporting structure not collapsing if the net 36 is ruptured or if the supporting structure is exposed to extremely large stresses.

The greatest advantage with the supporting structure according to FIGS. 2 and 3 over that in FIGS. 1 and 1A is that the horizontal tube 24, 24', 29 are rotatable in the holes 22a, 22a', 22c, which allows the buoys 4 a motion e.g. due to waves, substantially independent of each other in a vertical direction, which considerably reduces breaking stresses in the supporting structure, while the structure remains stiff in the horizontal plane, i.e. it resists movements in the horizontal direction. This advantage will be most noticeable if four buoys 4 and only one supporting frame are used, the buoys forming the corners of a rectangle, since the angles between the tubes 24 and thereby between the holes 22a are right-angles. For example, a movement downward, by one of these four buoys causes associated tube 22 to force downwards the ends of adjacent two tubes 24 introduced therein, but since the tubes 24 are simultaneously turned in the holes 22a in the adjacent two tubes 22 the downwardly directed movement of said buoy is not propagated in its entirety to the buoys fastened to said last mentioned tubes 22. This circumvents breaking stresses in the supporting structure and makes the structure more accommodating to high seas. Another advantage is that the structure shown in FIGS. 2 and 3 can be more easily adjusted to nets having different depths, and that further tubes similar to the tubes 24 can be inserted in further holes similar to holes 22a, b and c situated at different angles relative to each other for building up further supporting structures for several nets. An example of such an addition is indicated by chain-dotted lines in FIG. 2.

The supporting structure shown in FIGS. 1 and 1A, which can naturally be provided with a supporting frame on the underside of the buoys as well, made up in the same way as shown for the tubes 14 and clamp 8, has the big advantage over the supporting structure shown in FIGS. 2 and 3 that the diameters of all the tubes 6 and 14 identical.

It should be understood that the invention is not limited to the embodiments described above and shown on the drawings. Thus, the number of buoys and tubes can be modified and adjusted to the size of the net and the environment in which the apparatus is intended to be used. Furthermore, one single supporting structure can be used for several nets, or a plurality of supporting structures can be built together into large systems where one or more buoys are common for several supporting structures and nets, it being possible just as well to replace at least one of the buoys with a portion of a quay or the like.

The invention is therefore only restricted by what is disclosed in the appended claims.

I claim:

1. A collapsible supporting structure for a fish net or the like comprising at least four bodies spaced from each other and floating on a water surface, a vertical supporting element supported on each body and projecting above the water surface, each supporting element having at least two angularly related sockets defined thereon above said water surface, elongated rigid connecting elements extending between adjacent pairs of supporting elements with opposite ends respectively received into respective sockets on said supporting elements, releasable lock means cooperating with said supporting elements and associated ends of said connecting elements to form a frame which is generally stiff in the horizontal plane and keeps said bodies at a predetermined distance from each other, and a flexible fish net having an upper peripheral edge detachably connected to said connecting elements and a center portion located below said water surface so that said structure can readily be collapsed by detachment of said fish net from said connecting elements and release of said releasable lock means.

2. A supporting structure as claimed in claim 1, characterized in that the supporting elements consist of substantially vertical bars detachably fastened to the bodies, and said bodies are formed as inflatable buoys.

3. A supporting structure as claimed in claim 2, characterized in that the elongate connecting elements consists of horizontal bars, the outer cross-sectional dimension of which is less than that of the vertical bars, said vertical bars having through-holes defining said angularly related sockets through which the horizontal bars are inserted, and said releasable lock means include a pair of rings received on each end of each horizontal bar and secured thereto to prevent substantial movement of the horizontal bars in their longitudinal direction relative to the vertical bars but accommodate turning in said holes.

4. A supporting structure as claimed in claim 2, characterized in that the elongate connecting elements consist of horizontal bars substantially of the same cross-sectional dimension as the vertical bars with said vertical bars having members at the upper ends thereof defining said sockets and in which said releasable lock means are set screws threaded into said members and engaging said horizontal bars.

5. A supporting structure as claimed in claim 1, characterized in that each supporting element has a portion projecting below each body below the water surface and further elongated rigid connecting elements extending between adjacent pairs of said portions and attached thereto to increase the stability of the supporting structure with said fish net detachably connected to said further elongated connecting elements.

6. A supporting structure as claimed in claim 1, characterized in that at least two opposed vertical supporting elements extend upwardly above said sockets, a bar extending between said opposed vertical supporting elements and secured thereto, said bar extending across said fish net and adapted to support a fish feed metering apparatus above the fish net.

7. A supporting structure as claimed in claim 1, characterized by at least one platform mounted on two mutually connected elongate connecting elements that extend from one of said supporting elements.

* * * * *